(12) United States Patent
Knight-Newbury et al.

(10) Patent No.: US 8,983,733 B2
(45) Date of Patent: Mar. 17, 2015

(54) VEHICLE BATTERY SAFETY SYSTEM

(75) Inventors: Heath Knight-Newbury, Bangalore (IN); Frederic Chausseron, Cergy (FR)

(73) Assignee: Autoliv Development AB, Värgärda (SE)

( * ) Notice: Subject to any disclaimer, the term of this patent is extended or adjusted under 35 U.S.C. 154(b) by 71 days.

(21) Appl. No.: 13/390,957

(22) PCT Filed: Sep. 4, 2009

(86) PCT No.: PCT/SE2009/050996
§ 371 (c)(1),
(2), (4) Date: Feb. 17, 2012

(87) PCT Pub. No.: WO2011/028160
PCT Pub. Date: Mar. 10, 2011

(65) Prior Publication Data
US 2012/0150393 A1     Jun. 14, 2012

(51) Int. Cl.
*B60L 3/04*     (2006.01)
*B60W 10/26*     (2006.01)

(52) U.S. Cl.
CPC ................................. *B60L 3/04* (2013.01)
USPC ............................................. 701/45; 701/36

(58) Field of Classification Search
CPC .......... B60L 30/00; B60L 3/04; B60L 11/18; B60R 16/04; B60R 21/0136; H01M 10/48; H02J 7/00; B60W 10/26
USPC ..................... 701/45, 31.7; 702/63
See application file for complete search history.

(56) References Cited

U.S. PATENT DOCUMENTS

| 4,958,851 A | * | 9/1990 | Behr et al. | 280/735 |
| 2005/0184495 A1 | | 8/2005 | Zerbe | |
| 2008/0084180 A1 | * | 4/2008 | Hasegawa | 320/112 |
| 2009/0099799 A1 | * | 4/2009 | Barsoukov et al. | 702/63 |
| 2009/0139781 A1 | * | 6/2009 | Straubel | 180/65.1 |

FOREIGN PATENT DOCUMENTS

| DE | 10 2006 007 960 A1 | 9/2007 |
| DE | 10 2008 010 971 A1 | 8/2009 |

(Continued)

OTHER PUBLICATIONS

PCT International Search Report—Aug. 5, 2010.

*Primary Examiner* — Helal A Algahaim
*Assistant Examiner* — Charles J Han
(74) *Attorney, Agent, or Firm* — Brinks Gilson & Lione

(57) ABSTRACT

A safety arrangement (1) for a motor vehicle having an electric battery (2) and an occupant safety device (6) such as an airbag (7) or seat-belt pre-tensioner. The arrangement (1) having a crash sensor (10) responsive to acceleration, a battery sensor (13-17) arranged to monitor a battery parameter indicative of the condition of the battery, an actuator (8) for activating the occupant safety device (6), and a control unit (9) operable to receive and process signals (x,b) from both the crash sensor (10) and the battery sensor (13-17). The control unit (9) is operable to issue an actuating command to the actuator (8) to activate the occupant safety device (6) in response to a signal x from the crash sensor. In a preferred embodiment, there is provided a second actuator (23,24,25) for activating a battery safety device (20,21,22); the control unit (9) being operable to issue an actuating command to the second actuator to activate the battery safety device upon receipt of both: i) a signal (x) from the crash sensor exceeding a predetermined threshold value $X_1$ and a ii) a signal b from the battery sensor satisfying a predetermined criterion.

11 Claims, 2 Drawing Sheets

(56) References Cited

FOREIGN PATENT DOCUMENTS

| | | | |
|---|---|---|---|
| DE | 102008010971 A1 * | 8/2009 | ............ H01M 10/48 |
| JP | WO 2006/022061 A1 | 3/2006 | |
| SE | WO 2008/079069 A1 | 7/2008 | |
| WO | WO 2006022061 A1 * | 3/2006 | |

* cited by examiner

VEHICLE BATTERY SAFETY SYSTEM

CROSS REFERENCE TO RELATED APPLICATIONS

This application is the National Stage of International Patent Application No. PCT/SE2009/050996, filed Sep. 4, 2009.

FIELD OF THE INVENTION

The present invention relates to a safety arrangement for a motor vehicle, and more particularly relates to a safety arrangement for a motor vehicle having an electric battery and an occupant safety device, such as an airbag or a seat-belt pre-tensioner.

BACKGROUND AND SUMMARY OF THE INVENTION

Most motor vehicles conventionally comprise an internal combustion engine to provide propulsive power, in combination with an electric battery for the purpose of starting the engine, and also to provide electrical power for auxiliary functions whilst the engine is not running.

It is also now common practice to provide motor vehicles with crash detector arrangements configured to activate safety devices such as, for example, air-bags or seat-belt pre-tensioners in order to provide protection to the occupants of the vehicle in the event of a crash involving the vehicle. Such crash detector arrangements typically comprise one or more crash sensors in the form of accelerometers in combination with an electronic control unit configured to receive and process the signals from each sensor and to issue an actuating command to activate an occupant safety device in the event that the signal received from the crash sensor meets certain criteria indicative of a crash.

In view of increasing concerns over the environmental impact of motor vehicles powered by internal combustion engines, there is now increased interest and importance in providing so called "cleaner" motor vehicles which produce less pollution in the form of gases which are deemed harmful to the environment. Accordingly, it is now becoming more and more common to provide motor vehicles which are powered electrically, at least during periods of their operation. For example, it has been proposed to provide electric vehicles which are driven by a large electrical motor drawing its power from a rechargeable battery.

It has also been proposed to provide so-called "hybrid" motor vehicles which typically combine a very fuel-efficient and "clean" internal combustion engine with an electric motor. Hybrid vehicles of this type are configured to be driven by the electric motor whenever possible or convenient, but are driven by the internal combustion engine when the propulsive power offered by the motor is insufficient to meet the instant performance demand, for example because the demand simply exceeds the performance limits of the electric motor, or because the source of electrical energy from which the motor draws its power contains insufficient charge. In such an arrangement, the motor typically draws its electric power from a large capacity rechargeable battery arranged to charge from an alternator connected to the engine when the combustion engine is running. However, it has also been proposed to provide electric-drive arrangements in which the motor draws its electric power from a series of high-capacity capacitors rather than from an electrochemical battery as such. The term "battery" as used in this patent specification is therefore intended to refer to any electrical energy storage device including, but not limited to, an electrochemical battery, a capacitor, a super-capacitor, etc.

As will be appreciated, electrically powered vehicles, and so-called hybrid vehicles of the general type described above require relatively large batteries, in order to provide sufficient electrical power for the propulsive motor. Accordingly, such batteries are typically configured to be very high voltage (typically approximately 300V) and to store a very significant amount of electrical energy (typically between 2-10 kWh), and as such represent a significant electrical hazard, particularly in the event of the vehicle being involved in a crash, or an internal short-circuit occurring within the battery. Additionally, batteries of a type suitable for use in electric or hybrid vehicles presently contribute very significantly to the overall cost of the vehicle. For example, it is not uncommon for the battery unit of such a vehicle to account for 10-30% of the total cost of the vehicle. It is therefore desirable to protect the battery unit from damage in the event that the vehicle is involved in an accident, thereby facilitating less-expensive repair of the vehicle.

As will be appreciated, batteries of the type described above can become extremely hot in the event of a short-circuit occurring either internally, or externally as a result of a crash, and hence represent a risk of fire or explosion in such circumstances. Another concern with high-energy electrical arrangements of this type is that damage caused to a motor vehicle in the event of an accident can cause parts of the internal circuitry of the vehicle to become damaged and expose live wiring which presents a shock hazard for the driver and passengers of the vehicle, and also to any rescue personnel in attendance.

There is therefore a need to provide modern motor vehicles with safety arrangements configured to make render the vehicle's battery safe in the event of an accident occurring.

It is an object of the present invention to provide an improved safety arrangement of a type suitable for use in a motor vehicle having an electric battery and an occupant safety device.

Whilst the invention described herein is particularly suitable for use in vehicles having a large capacity battery to power a propulsive motor, it should be noted that the application could also be used in a motor vehicle with a relatively small capacity battery provided to start an internal combustion engine.

Accordingly, the present invention provides a safety arrangement for a motor vehicle having a battery and an occupant safety device, the arrangement comprising a crash sensor responsive to acceleration, a battery sensor arranged to monitor a battery parameter indicative of the condition of the battery, an actuator for activating the occupant safety device, and a control unit operable to receive and process signals from both the crash sensor and the battery sensor, the control unit being operable to issue an actuating command to the actuator to activate the occupant safety device in response to a signal from the crash sensor.

Preferably, the safety arrangement comprises a second actuator for activating a battery safety device; the control unit being operable to issue an actuating command to said second actuator to activate the battery safety device upon receipt of both: i) a signal from the or at least one said crash sensor exceeding a predetermined threshold value, and ii) a signal from the or at least one said battery sensor satisfying a predetermined criterion.

Conveniently, said control unit is operable to perform a step of processing said signal from the battery sensor in accordance with an algorithm effective to calculate the rate of change of said battery parameter.

Advantageously, said control unit is operable to perform a step of comparing said calculated rate of change value to a predetermined rate of change threshold value, said predetermined criterion being met when said calculated rate of change value exceeds the rate of change threshold value.

Preferably, said control unit is configured to perform said steps of processing and comparing in response to the receipt of a signal from the crash sensor exceeding said predetermined threshold value.

Conveniently, said control unit is configured to perform said steps of processing and comparing in response to the receipt of a signal from the battery sensor representative of said battery parameter exceeding a predetermined battery parameter threshold value, and the control unit being operable to issue an actuating command to said second actuator to activate the battery safety device in response to said calculated rate of change value exceeding said rate of change threshold value, even in the absence of a signal from the crash sensor exceeding said predetermined threshold value.

Advantageously, the control unit is configured also to compare the signal received from the crash sensor to a second threshold value, the second threshold value being higher than said predetermined threshold value, the control unit being operable to issue an actuating command to said second actuator effective to activate the battery safety device upon receipt of a signal from said crash sensor exceeding said second threshold value, regardless of the signal received from the battery sensor.

Preferably, said control unit is configured to continue monitoring the battery sensor after issuance of an actuating command to the second actuator to activate the battery safety device.

The safety arrangement may comprise a said battery sensor in the form of a gas sensor configured to detect the presence of carbon dioxide or carbon monoxide in said battery and to generate a signal indicative of the level of carbon dioxide or carbon monoxide detected.

Additionally, or alternatively, the safety arrangement may comprise a said battery sensor in the form of a temperature sensor configured to measure the internal temperature of said battery and to generate a signal indicative of said temperature. In such an arrangement, it is envisaged that the predetermined battery parameter threshold value against which the signal from the temperature sensor is assessed may be set at approximately 40° C., with temperature signals in excess of 40° C. being considered abnormal. Also, it is envisaged that in such an arrangement, the predetermined rate of change threshold value against which the calculated rate of change value derived from the temperature sensor is compared may be set at approximately 10° C./second.

The safety arrangement may comprise a battery sensor in the form of a pressure sensor configured to measure the internal gas pressure within said battery and to generate a signal indicative of said pressure. In such an arrangement, it is envisaged that the control unit may be configured to calculate a predicted pressure value according to Boyle's Law, with said predetermined battery parameter threshold value, against which the signal from the pressure sensor is assessed, being set at approximately 10% above the predicted pressure value. Also, it is envisaged that in such an arrangement, the predetermined rate of change threshold value against, which the calculated rate of change value derived from the pressure sensor is compared, may be set at approximately 5% per second.

The safety arrangement may comprise a battery sensor in the form of an electric current measuring device configured to measure the electrical current provided by said battery and to generate a signal indicative of said current.

The safety arrangement may comprise a battery sensor in the form of a discharge monitor configured to measure the rate of discharge of the battery and to generate a signal indicative of said rate of discharge. In such an arrangement, it is envisaged that the predetermined rate of change threshold value against which the discharge rate derived from the sensor is compared would be set at around 98% of the maximum value prescribed by the battery specification. A discharge rate greater than 100% of the maximum specified value for the battery would be considered representative of critical conditions in which the battery safety device should be activated.

Preferably, said control unit is electrically connected to an independent power supply, separate from the main vehicle battery, such that the control unit and associated circuitry of the safety arrangement can draw sufficient electrical power for operation after failure or disconnection of the main battery.

BRIEF DESCRIPTION OF THE DRAWINGS

So that the invention may be more readily understood, and so that further features thereof may be appreciated, embodiments of the invention will now be described by way of example with reference to the accompanying drawings, in which.

DETAILED DESCRIPTION OF THE INVENTION

Figure 1:
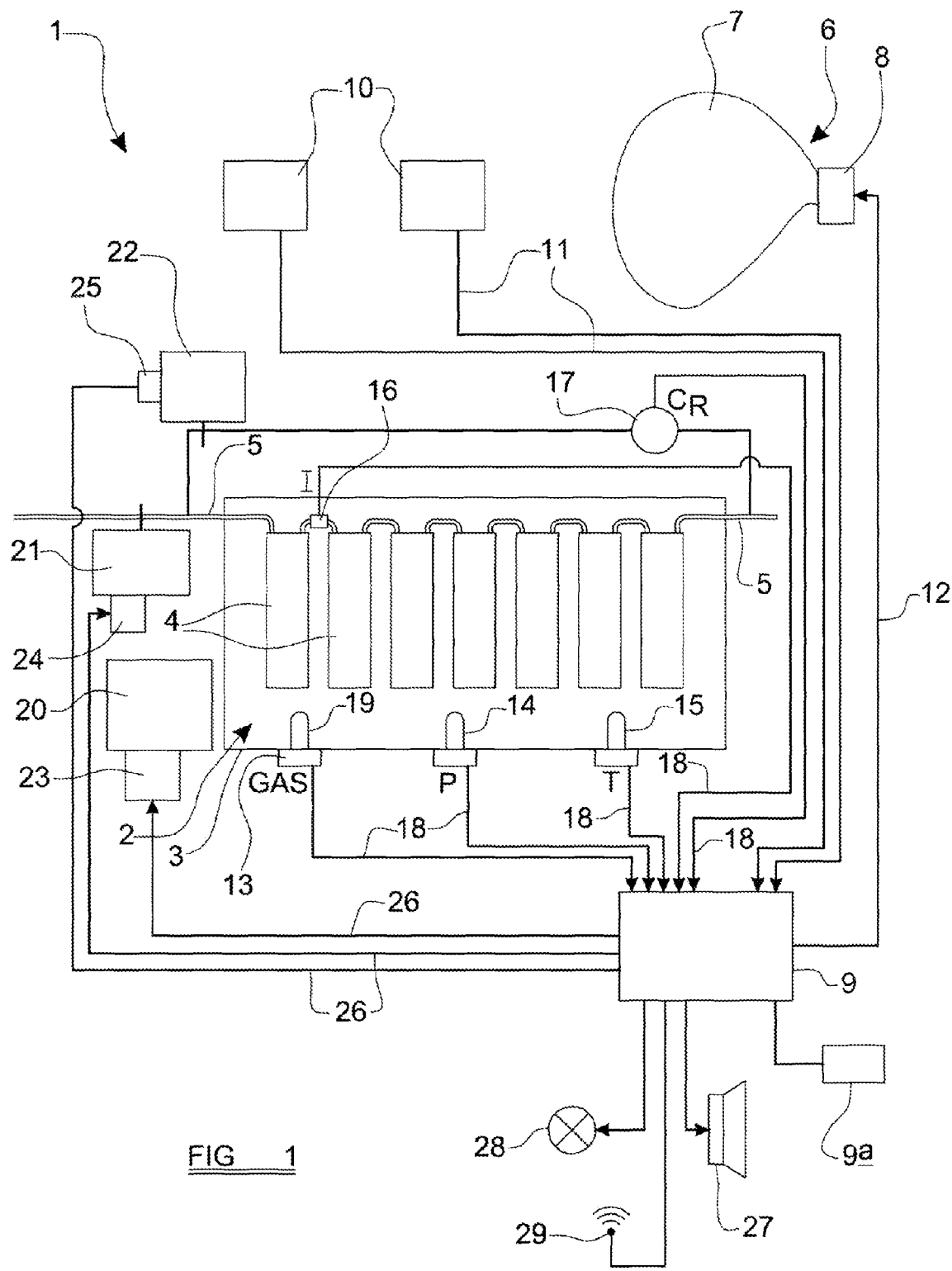
FIG. 1 is a schematic block diagram illustrating components of a safety arrangement in accordance with an embodiment of the present invention.

Referring now in more detail to FIG. 1, there is illustrated a motor vehicle safety arrangement 1 in accordance with the present invention. In particular, a vehicle battery 2 is illustrated, which comprises a battery housing 3 within which there is provided a plurality of individual cells 4 which are electrically connected to one another in series. For example, in the case of an electrically powered or hybrid vehicle, it is envisaged that the battery 2 could take the form of a lithium ion battery comprising a series of cells connected so as to give the battery a total output voltage of approximately 300V and a total energy level of 2-10 kWh. The battery has a pair of terminals 5 which are electrically connected to the electrical system of the motor vehicle.

In a generally conventional manner, the motor vehicle is also provided with a number of occupant safety devices such as the device 6 illustrated schematically in FIG. 1 which is shown in the form of an inflatable airbag 7 having an associated actuator 8. The actuator 8 is electrically connected to an electronic control unit 9 which is electrically connected to an independent power supply 9a, such as a battery or capacitor, which is separate from the main vehicle battery 2 and is configured to provide sufficient electrical power for the control unit 9 and associated components of the safety arrangement to operate (at least for a limited period of time) in the event of failure of the main battery 2 or disconnection of the main battery 2 from the vehicle's electrical system. The control unit 9 is also arranged to receive signals from a number of crash sensors 10 which are distributed in an appropriate manner within the motor vehicle, each of which is responsive to acceleration in a manner known per se.

The crash sensors 10 are electrically connected to the control unit 9 via respective connection lines 11, and the control unit is electrically connected to the actuator 8 of the occupant safety device 6 via an output line 12. In a generally conventional manner, the control unit is operable to issue an actuating command via the output line 12 to the actuator 8 in order to activate the occupant safety device 6 in response to a signal from one or more of the crash sensors 10 indicative of a crash occurring.

In addition to being electrically connected to the crash sensors 10, the control unit 9 of the present invention is also electrically connected to at least one battery sensor arranged and configured to monitor a battery parameter indicative of the physical or electrical condition of the battery. The particular arrangement illustrated in FIG. 1 comprises a plurality of such battery sensors 13, 14, 15, 16 and 17, each of which is arranged to monitor a respective battery parameter and transmit a signal representative of the measured parameter to the control unit 9.

In particular, the battery 2 in the arrangement illustrated in FIG. 1 is provided with a gas sensor 13, a pressure sensor 14, a temperature sensor 15, a current sensor 16 and a discharge rate sensor 17, each of which is electrically connected to an input of the control unit 9 via a respective input line 18.

The gas sensor 13 is configured to be mounted to the battery housing 3 and comprises a gas-detecting probe 19 which extends into the housing. The gas sensor 13 is configured to detect the presence of carbon dioxide and/or carbon monoxide, and hence is effective to produce a signal in response to the accumulation of combustion gases within in the battery housing 3.

The pressure sensor 14 is also configured to extend into the interior volume of the battery housing 3 and is arranged to measure the internal gas pressure within the housing 3.

The temperature sensor 15 comprises a probe arranged to extend into the interior volume of the battery housing 3 and is arranged to measure the internal temperature of the battery 2.

The current sensor 16 takes the form of a current measuring device which is connected between a pair of battery cells 4 and which is configured to produce a signal representative of the level of electric current provided by the battery 2.

The discharge sensor 17 is electrically connected across the battery terminals 5 and is configured to produce a signal representative of the instantaneous rate of discharge of the battery.

The safety arrangement 1 also comprises a number of battery safety devices 20, 21, and 22, each of which is associated with a respective actuator 23, 24, and 25, the actuators each being electrically connected to the control unit 9 via a respective output line 26.

It is envisaged that each of the battery safety devices 20, 21, and 22 will take a different form and thus be configured to render the battery safe upon actuation in response to signals from the battery sensors representative of different battery conditions. For example, one of the battery safety devices 20 may be provided in the form of a cooling device configured to cool the battery 2, for example by using a source of compressed gas, and which is intended to be activated in the event that the safety arrangement detects an abnormal or dangerous increase in the temperature of the battery, via appropriate signals from the temperature sensor 15.

Another of the battery safety devices 21 may be configured so as to electrically disconnect the battery from the electrical circuitry of the motor vehicle upon activation. In this regard, it is envisaged that the disconnect device 21 could be configured either to disconnect the battery in a reversible manner, a non-reversible manner or a semi-reversible manner.

Another of the safety devices 22 can take the form of a discharge device intended to rapidly discharge the battery upon electrical connection across the battery terminals 5 in response to an appropriate actuation command from the control unit 9. For example, the safety device 22 may comprise a number of discharge resistors arranged for electrical connection across the terminals 5 of the battery upon activation of the device 22.

The control unit 9 may optionally be connected to one or more peripheral devices such as a siren or loud speaker 27, a warning lamp or flashing light 28 and/or an emergency signal transmitter 29.

It is to be noted that a key feature of the present invention is the fact that the control unit 9 is configured to receive and process signals from the crash sensors 10 and to activate the occupant safety device 6 in dependence upon such crash signals, but is also arranged to receive and process signals received from one or more battery sensors 13, 14, 15, 16, and 17. In the arrangement illustrated in FIG. 1, the control unit 9 is furthermore configured to issue an actuating command to the actuator of at least one of the battery safety devices, 20, 21, and 22 in the event of an accident situation being detected by one or more crash sensors 10 and in response to a signal from one of the battery sensors 13, 14, 15, 16, and 17 satisfying a predetermined activation criterion. As will therefore be appreciated and as will be explained in more detail below, the safety arrangement of the present invention is configured to detect the occurrence of dangerous faults in the battery 2 by use of an integrated control unit which also functions to activate an occupant safety device upon detection of a crash involving a motor vehicle.

The present invention thus permits the provision of a battery safety arrangement via only relatively minor modification of an otherwise standard control unit 9 of a type currently found in many motor vehicles and specifically configured to manage the operation and activation of occupant safety systems including occupant safety devices such as, for example, airbags and/or seat-belt pre-tensioners.

The preferred embodiment of the present invention is intended to be configured so as to substantially continuously monitor the electrical and/or physical condition of the battery 2 during normal driving conditions in the absence of any signals from the crash sensors 10 indicative of a crash occurring. Thus, during normal driving conditions it is intended that the control unit 9 will operate to monitor the signals b from each battery sensor 13, 14, 15, 16, and 17. The control unit 9 includes a memory which is pre-programmed with a respective predetermined battery parameter threshold value B in respect of each measured parameter of the battery. Upon receipt of a signal b from any one of the battery sensors 13, 14, 15, 16, and 17 representative of the respective measured parameter exceeding the relevant predetermined threshold value B, the control unit 9 operates to warn the driver of the motor vehicle that an abnormal battery condition has been detected, for example by lighting the warning lamp 28 and/or sounding an alarm via the speaker 27. Upon receipt of a battery signal b in excess of the relevant threshold value B, the control unit 9 is operable to process the signal b in accordance with an algorithm which is effective to calculate the rate of change of said parameter $\Delta b/t$. The control unit 9 then continues to monitor the calculated rate of change value $\Delta b/t$ of the parameter and compares it to a predetermined rate of change threshold value R held within the memory of the control unit. In the event that the calculated rate of change value $\Delta b/t$ exceeds the predetermined rate of change threshold value R, the control unit issues an actuating command along line 18 to activate a relevant battery safety device 20, 21, and 22. For example, it is envisaged that in such circumstances, the control unit will operate to activate the battery disconnect device 21 and/or the battery cooling device 20.

In the event of the motor vehicle being involved in a crash, one or more of the crash sensors 10 will transmit a crash signal x to the control unit along a respective input line 11, the or each crash signal x being indicative of the severity of the crash. The memory of the control unit 9 is pre-programmed with two crash signal threshold values; namely a first relatively low threshold value $X_1$, and a second relatively high threshold value $X_2$. The control unit 9 is operable to compare the crash signals x received from the crash sensors 10 to these two threshold values in order to assess the severity of the accident. For example, a signal x from a crash sensor which exceeds neither of the threshold values will be indicative no impact occurring, or of an extremely low speed impact posing no perceived risk to the battery 2. On the other hand, a crash signal x exceeding the first threshold value $X_1$ but not the second threshold value $X_2$ will be indicative of a low speed impact posing an increased risk to the battery and deemed severe enough to require monitoring of the battery. A crash signal x exceeding both of the threshold values $X_1$ and $X_2$ will be indicative of a high speed impact posing a significant risk to the battery necessitating immediate activation of a battery safety device, and in particular the disconnect device 21 and optionally the cooling device 20. The preferred operating regime of the safety arrangement 1 is illustrated schematically by the flow diagram of FIG. 2.

As illustrated, upon receipt of a crash sensor signal x (at step 30), the control unit 9 compares (at step 31a) the signal to the first threshold value $X_1$. If x is less than $X_1$, then the control unit begins monitoring the battery sensors 13, 14, 15, 16, and 17 (step 32). If the control unit 9 receives a signal b from any of the battery sensors 13, 14, 15, 16, and 17 which is determined by comparison step 33 to be greater than the predetermined battery parameter threshold value B, then the control unit changes mode and begins to monitor the rate of change of the relevant battery parameter Δb/t (step 34). On the other hand, if b is less than B, then the control unit reverts to its initial mode of monitoring the battery sensors at step 32.

The calculated rate of change value derived from step 34 is then compared in step 35 to the predetermined rate of change threshold value R. If Δb/t is determined to exceed R, then an actuating command is issued from the control unit 9 via the relevant output line 26 in order to activate the battery disconnect device 21 at step 36.

Returning now to consider the crash sensor parameter comparison step 31a; if the crash signal x is determined to be greater than the first threshold value $X_1$, then the control unit 9 performs a step 31b in which the crash signal x is compared to the second threshold value $X_2$. If x is less than $X_2$, the control unit moves to step 34 in which it begins to monitor the rate of change of the relevant battery parameter Δb/t as proposed above.

Figure 2:
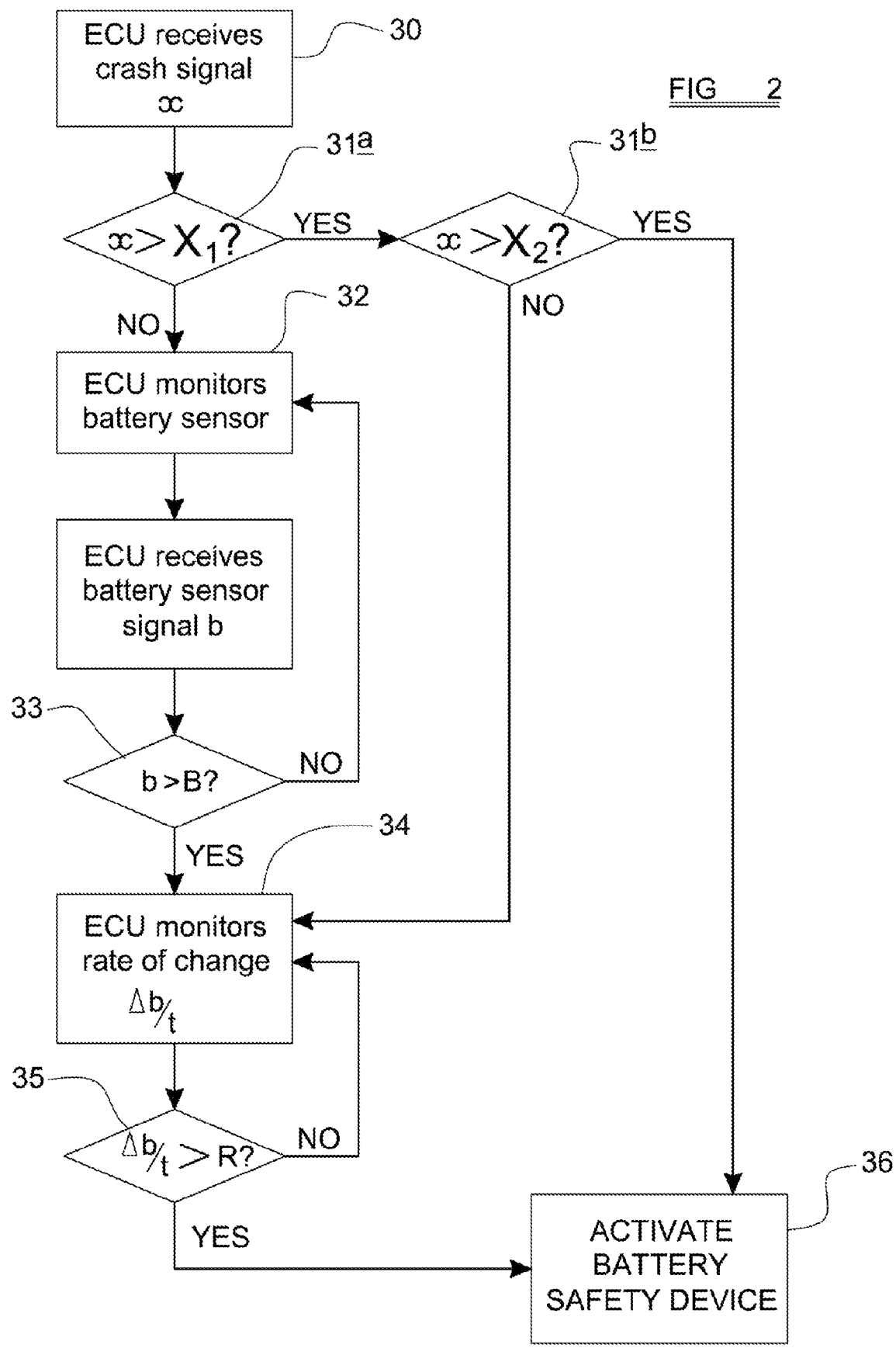
FIG. 2 is a flow-diagram illustrating schematically an operating regime for the safety arrangement of FIG. 1.

Although not shown in FIG. 2, it is envisaged that in the event that the battery disconnect device 21 is then activated according to subsequent comparison step 35 in response to the crash signal x exceeding the first threshold value $X_1$ in this manner, the control unit 9 will continue to monitor the signals received from the battery sensors. For example, in the event that the temperature sensor 15 issues a signal representative of a continued increase in the temperature of the battery after disconnection, or the pressure sensor 14 issues a signal representative of a continued increase in pressure within the battery housing, the control unit will issue an actuating command to the battery cooling device 20 and/or the battery discharge device 22.

If, at comparison step 32, the crash signal x is found to exceed the second threshold value $X_2$, then the control unit 9 operates immediately to issue an actuating command to the battery disconnect device 21 and optionally also the battery cooling device 20. It is also proposed that in such circumstances the control unit 9 will continue to monitor the signal b issued by one of more of the battery sensors, for example the temperature sensor 15, and to transmit a warning signal via the lamp 28, and/or the siren 27, and/or the transmitter 29 in order to warn emergency personnel in the event that the temperature of the battery reaches a predetermined level deemed dangerous to such personnel. It is therefore envisaged that the separate power supply 9a associated with the control unit 9 will have sufficient capacity to provide electrical power for several hours operation of the safety arrangement in this mode.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A safety arrangement (1) for a motor vehicle having a battery (2) and an occupant safety device (6), the arrangement comprising:
    a crash sensor (10) responsive to acceleration,
    a battery sensor (13-17) arranged to monitor a battery parameter indicative of a condition of the battery, the battery parameter being at least one of the following parameters: presence of carbon dioxide, presence of carbon monoxide, gas pressure inside the battery, internal temperature, electric current provided by the battery, and rate of discharge of the battery;
    an actuator (8) for activating the occupant safety device, and
    a control unit (9) operable to receive and process signals (x, b) from both the crash sensor (10) and the battery sensor (13-17),
    the control unit (9) being configured to simultaneously monitor a first safety condition, a second safety condition, and a third safety condition that may be met simultaneously,
    the control unit (9) being operable to issue an occupant safety actuating command to the actuator (8) to activate the occupant safety device (6) under the first safety condition in response to the signal from the crash sensor (10),
    further comprising a second actuator (23,24,25) for activating a battery safety device (20,21,22);
    the control unit (9) being operable to issue a battery safety actuating command to the second actuator to activate the battery safety device under the second safety condition upon receipt of both the signal from the crash sensor (10) exceeding a predetermined threshold value ($X_1$) and the signal from the battery sensor satisfying a predetermined criterion, wherein the control (9) unit is further configured to compare the signal received from the crash sensor (10) to a second threshold value ($X_2$), the second threshold value ($X_2$) being higher than the predetermined threshold value ($X_1$), the control unit being operable to issue the battery safety actuating command to the second actuator (23,24,25) effective to activate the battery safety device (20,21,22) under the third safety condition upon receipt of a signal from the crash sensor (10) exceeding the second threshold value ($X_2$), regardless of the signal received from the battery sensor (13-17).

2. The safety arrangement according to claim 1, wherein the control unit (9) is further operable to perform a step of processing the signal from the battery sensor (13-17) in accordance with an algorithm effective to calculate a rate of change value of a battery parameter over time.

3. The safety arrangement according to claim 2, wherein the control unit (9) is further operable to perform a step of comparing the calculated rate of change value to a predetermined rate of change threshold value (R), the predetermined criterion being met when the calculated rate of change value exceeds the rate of change threshold value (R).

4. The safety arrangement according to claim 3, wherein the control unit (9) is further configured to perform steps of processing and comparing in response to the receipt of the signal from the crash sensor (10) exceeding the predetermined threshold value ($X_1$).

5. The safety arrangement according to claim 3, wherein the control unit (9) is configured to perform the steps of processing and comparing in response to the receipt of the signal from the battery sensor (13-17) representative of the battery parameter exceeding a predetermined battery parameter threshold value (B), and the control unit being operable to issue the second actuating command to the second actuator (23,24,25) to activate the battery safety device (20,21,22) in response to the rate of change value exceeding the rate of change threshold value (R), even in the absence of the signal (x) from the crash sensor (10) exceeding the predetermined threshold value ($X_1$).

6. The safety arrangement according to claim 1, wherein the control unit (9) is configured to continue monitoring the battery sensor (13-17) after issuance of the battery safety actuating command to the second actuator (23,24,25) to activate the battery safety device (20,21,22).

7. The safety arrangement according to claim 1, further comprising the battery sensor in the form of a gas sensor (13) configured to detect the presence of carbon dioxide or carbon monoxide in the battery (2) and to generate the signal from the battery sensor indicative of the level of carbon dioxide or carbon monoxide detected.

8. The safety arrangement according to claim 1, further comprising the battery sensor in the form of a temperature sensor (15) configured to measure the internal temperature of the battery (2) and to generate the signal from the battery sensor indicative of the temperature.

9. The A safety device according to claim 1, further comprising the battery sensor in the form of a pressure sensor (14) configured to measure the internal gas pressure within the battery (2) and to generate the signal from the battery sensor indicative of the pressure.

10. The safety device according to claim 1, further comprising the battery sensor in the form of an electric current measuring device (16) configured to measure the electrical current provided by the battery (2) and to generate the signal from the battery sensor indicative of the current.

11. The safety device according to claim 1, further comprising the battery sensor (17) in the form of a discharge monitor configured to measure the rate of discharge of the battery (2) and to generate the signal from the battery sensor indicative of the rate of discharge.

* * * * *